US012505006B2

(12) United States Patent
Heinle

(10) Patent No.: US 12,505,006 B2
(45) Date of Patent: *Dec. 23, 2025

(54) METHODS, SYSTEMS, AND MEDIA FOR SCALABLE VERIFICATION OF COMPUTE CLUSTER CONFIGURATIONS

(71) Applicant: Heinle Solutions Inc., Ottawa (CA)

(72) Inventor: Albert Heinle, Ottawa (CA)

(73) Assignee: Heinle Solutions Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,399

(22) Filed: Mar. 8, 2024

(65) Prior Publication Data

US 2025/0036510 A1    Jan. 30, 2025

Related U.S. Application Data

(63) Continuation of application No. 17/565,017, filed on Dec. 29, 2021, now Pat. No. 11,928,012.

(60) Provisional application No. 63/252,786, filed on Oct. 6, 2021.

(51) Int. Cl.
*G06F 11/07* (2006.01)
*H04L 41/0873* (2022.01)

(52) U.S. Cl.
CPC ........ *G06F 11/079* (2013.01); *G06F 11/0709* (2013.01); *G06F 11/0751* (2013.01); *H04L 41/0873* (2013.01)

(58) Field of Classification Search
CPC ............... G06F 11/079; G06F 11/0709; G06F 11/0751; H04L 41/0873
See application file for complete search history.

(56) References Cited

U.S. PATENT DOCUMENTS

| | | |
|---|---|---|
| 6,925,492 B2 | 8/2005 | Shirriff |
| 7,370,101 B1 | 5/2008 | Lakkapragada et al. |
| 7,543,046 B1 | 6/2009 | Bae et al. |
| 8,788,465 B2 | 7/2014 | Fontenot et al. |
| 9,459,995 B2 | 10/2016 | Dolinsky et al. |
| 10,187,255 B2 | 1/2019 | Mukherjee et al. |
| 10,333,784 B2 | 6/2019 | Liu et al. |
| 10,374,877 B2 | 8/2019 | Patterson et al. |
| 10,986,174 B1 | 4/2021 | Sharma et al. |

(Continued)

OTHER PUBLICATIONS

Moreno Ambrosin, Mauro Conti, Ahmad Ibrahim, Gregory Neven, Ahmad-Reza Sadeghi, Matthias Schunter, Sana: Secure and scalable aggregate network attestation, Oct. 24, 2016.

(Continued)

*Primary Examiner* — Nicholas P Celani
(74) *Attorney, Agent, or Firm* — Smart & Biggar LP

(57) ABSTRACT

Methods, systems, and computer-readable media for verification of configurations of compute clusters. An automatic computational process is used to statically and/or dynamically verify configurations of software components installed on one or more interconnected computing entities constituting a compute cluster. Cluster configuration data is obtained, including data representative of a configuration of the software components. The cluster configuration data is processed to identify errors relating to interactions between the software components. Errors may be reported to users and/or corrected by modifying the compute cluster configuration.

20 Claims, 6 Drawing Sheets

(56) References Cited

U.S. PATENT DOCUMENTS

| | | |
|---|---|---|
| 11,044,148 B2 | 6/2021 | Patterson et al. |
| 11,928,012 B2* | 3/2024 | Heinle .................. H04L 43/065 |
| 2015/0052402 A1* | 2/2015 | Gurumurthy ....... G06F 11/3688 |
| | | 714/38.1 |
| 2015/0324277 A1* | 11/2015 | Dolinsky .............. H04L 41/022 |
| | | 714/38.1 |
| 2016/0164762 A1* | 6/2016 | Reque ................. G06F 9/45533 |
| | | 718/1 |
| 2019/0052531 A1 | 2/2019 | Sividia et al. |
| 2020/0119983 A1 | 4/2020 | D'Onofrio et al. |
| 2020/0136900 A1 | 4/2020 | Tarrant |
| 2020/0351157 A1* | 11/2020 | Patterson ............ H04L 41/0672 |
| 2020/0412741 A1* | 12/2020 | Shankar ............. G06F 21/6218 |
| 2022/0365835 A1* | 11/2022 | Kandasamy ........ G06F 11/0793 |

OTHER PUBLICATIONS

Christopher Dabrowski, Reliability in grid computing systems, Jun. 10, 2009.

Raab, Markus & Denner, Bernhard & Hahnenberg, Stefan & Cito, Jürgen. (2020). Unified Configuration Setting Access in Configuration Management Systems. 331-341. 10.1145/3387904.3389257.

* cited by examiner

```
{
    "name": "cluster1",                                                400
    "customerId": "cluster1Customer",
    "machines":
    {
        "machine1": {
            "id": "ny123",
            "hostName": "example.com",
            "externalIp": "127.0.0.1",
            "internalIp": "127.0.0.1",
            "services": {
                "Kerberos": {
                    "version": "1.0",
                    "serviceName": "kerberos",
                    "configFileList": [
                        {
                            "fileName": "krb5.conf",
                            "defaultFileName": "krb5.conf",
                            "subPath": ".",
                            "configFileType": "krb"
                        },
                        {
                            "fileName": "kdc.conf",
                            "defaultFileName": "kdc.conf",
                            "subPath": ".",
                            "configFileType": "krb"
                        }
                    ]
                }
            }
        }
    }
}
```

FIG. 4

```
                                                                       500
{
  "identifier": "kerberos_default_tkt_enctypes",
  "severity": 3,
  "documentation": "...",
  "clauses": [
    {
      "literals": [
        {
            "service": "kerberos",
            "configurationFile": "krb5.conf",
            "keyPath": ["libdefaults", "default_tkt_enctypes"],
            "operator": "keyShouldNotExist"
        }
      ]
    }
  ]
}
```

FIG. 5

METHODS, SYSTEMS, AND MEDIA FOR SCALABLE VERIFICATION OF COMPUTE CLUSTER CONFIGURATIONS

REFERENCE TO RELATED APPLICATIONS

This application is a continuation of U.S. patent application Ser. No. 17/565,017 filed Dec. 29, 2021, which claims priority to U.S. Provisional Patent Application No. 63/252,786, filed Oct. 6, 2021, the contents of which are herein incorporated by reference in its entirety into the DETAILED DESCRIPTION herein below.

TECHNICAL FIELD

The present application generally relates to software configuration management, and in particular to verification of configurations of compute clusters and their constituent hardware and software components.

BACKGROUND

Most customer-facing computing services share a common set of back-end tools. Some examples of such back-end tools, sometimes referred to as "software components", are: databases, authentication and authorization services, streaming services, distributed file systems, and text search services.

The computing devices executing the software components underlying the computing services may be located on-site at the service provider's location or may be hosted by a cloud service provider. In either case, the computing devices can be configured using techniques and processes referred to as "Infrastructure as Code" (IaC). IaC typically refers to the process of managing and provisioning computer data centers through machine-readable definition files, rather than physical hardware configuration or interactive configuration tools.

Developers build software applications to deliver these computing services, utilizing these computing devices and back-end tools. However, most of the software applications allow for an insecure setup (e.g. default passwords or no authentication at all, no encryption of communication channels, etc.). This means that the software applications can be executed even if their configurations are insecure—in the worst case, this may enable a malicious party to either access data of the software application or do other harm to the system executing the software application. Some such software applications also fail to require a configuration that ensures high availability and protection against data loss, allowing the software application to be executed in a manner likely to fail, become unavailable, and/or lose important data. Some of these flaws can be detected by manually auditing the configuration files, while more subtle such flaws are only typically caught by careful experts who are highly knowledgeable about the respective software components and their interconnections.

Data breaches have been increasing in frequency in recent years. This increase in data breaches shows that computing services are being deployed in insecure ways in production systems, exposing the sensitive data of potentially millions of people. One of the root causes of the deployment of these flawed configurations is a lack of appropriate tools to assist with proper configuration of the various components used by a software application or computing service.

Several tools exist that attempt to assist developers with configuration of components used by software applications, or components that are software applications themselves. Typically, these approaches focus on static analysis of individual configuration files for individual components in isolation. Thus, the configuration file for a specific component (e.g., a database component, or a text search component) is considered separately from the configuration files for each other component relied upon by the overall software application. Cybersecurity benchmarks, such as the various benchmarks promulgated by the National Institute of Standards and Technology (NIST) and/or the Center for Internet Security (CIS), may be applied by some of these existing approaches. Examples of such existing tools for analyzing configuration files include:

SemGrep, used to analyze configuration files for Docker, NginX, Terraform and Kubernetes.
CIS-CAT, the implementation of the CIS benchmarks.
Red Hat Insights, a configuration checker for Red Hat Linux deployments.
TerraScan, a scanning engine for TerraForm files.
Kube-Score, a tool for scanning Kubernetes files.
Snyk, for analyzing configuration files for TerraForm and Kubernetes.
Conftest, an engine to write tests for individual configuration files.
Checkov, a code analysis tool for Infrastructure as Code tools such as Terraform, Kubernetes, and CloudFormation.

These tools and other existing approaches focus on a specific software component or small set of software components, and the configuration file analysis performed by these tools is either community-driven or follows a set of well-known benchmarks.

These tools are applied by creating a pre-deployment procedure for analyzing eligible configuration files of a software application before software code containing these configuration files is merged into the application. None of these tools analyze the interconnections between the different software components. Furthermore, few or none of these tools are configured to analyze all possible permutations or alterations of standard configuration files.

Accordingly, there is a need for an automated tool for verifying software component configurations that addresses one or more of the limitations of existing approaches described above.

SUMMARY

Example embodiments relate to methods, systems, and computer-readable media for verification of configurations of compute clusters. In some embodiments, an automatic computational process is used to statically and/or dynamically verify configurations of software components installed on one or more interconnected computing devices constituting a compute cluster. The software components are used by the computing devices of the compute cluster to enable execution of a software application.

In some examples, the method operates to find flaws in the individual configurations of individual software components, taking into account combinations of these configurations and further information known about the computing devices, properties of the communication network interconnecting the computing devices, and access management relating to the computing devices.

In some examples, the method operates to analyze a wide variety of possible software components on the computing devices, as well as the ways the computing devices interconnect. A verification engine is built which is extendable to new software components and new compute cluster information types. The verification engine includes rules configured to work with representations of the entire compute cluster.

In some examples, the method operates to inform users about potential mistakes they have made in configuring the software components of the computing devices. In some examples, this information may be provided to users prior to deployment of the software application.

In some examples, the method is scalable, e.g., the method is extendable to new configuration file types, new software components, and/or new hosting services with relatively small effort.

In some examples, the method provides reports to users which help the users to correct flaws in the configuration of the software application and/or its constituent software components. In some examples, the reports may be used to evaluate the performance of administrators managing the compute cluster and provide accountability for said administrators. In some examples, the method can be used to write rules and verify computational systems which span across different domains, e.g. hybrid-cloud systems.

In some examples, the method verifies configurable software components on one or more computing entities, such as, but not limited to, physical computing devices and abstract computational entities such as containers. These computing entities may be in communication with each other through physical or logical means (e.g. via bridge networks), and provide installed software components with the ability to communicate and control communication via standard protocols such as TCP/IP or UDP. A collection of these computing entities, their communication channels, and their access management rules may be referred to herein as a compute cluster or simply a cluster.

In some embodiments, the method is capable of evaluating whether or not the software components installed on the computing entities are configured in a secure way, by using best practices in the cybersecurity field and by using known solutions to known issues. In some embodiments, the method is not limited to analyzing individual configurations of individual; software components, but is configured to analyze the cluster as a whole and determine flaws in the cluster setup, based on all available information. The analysis may be performed using a dynamically adjustable set of rules, which take into account the individual configurations of software components on each computing entity, as well as the interconnection between the software components on different computing entities, and also taking into account any identity management information and/or access management information. The rules may be formulated using a programming language in combination with a simple, custom, descriptive language.

As used herein, the noun "configuration" refers to a selection of direct or nested parameters, and possibly associated values, that define behaviors of one or more software components when executed. These parameters and/or associated values may be obtained by reading configuration files or other configuration data, determining the IP addresses of network nodes (e.g. computing entities) in a communication session, determining what communication protocols are being used in a communication session, determining an amount of memory that is being allocated, determining access management settings of a computing entity or software component, etc.

An "error" in a configuration is any undesired, unsafe, non-standard or non-optimal feature of a configuration. Errors can include, but are not limited to, the following items:

A configuration which may enable an unauthorized user access to the software component functionality directly, or to a software and/or hardware component associated with the functionality of the specific software component.

A configuration which may enable an unauthorized party to intercept and read communications sent and/or received by the respective software component.

A configuration which may cause preventable downtime of the overall system (e.g. the compute cluster, computing entity, or software component).

A configuration which does not follow best practices for the specific software component.

A missing configuration that presents itself as a workaround to a known issue with the software component itself.

A configuration compromising the correct functionality of the overall system.

A configuration where additional configuration parameters are needed in order to achieve a desired effect.

A configuration that is superfluous.

A configuration that has no effect in the version of the software component that is being used.

A configuration that is known to compromise the performance of the overall system.

A configuration which violates best-practice principles, such as "zero-trust".

In a first aspect, the present disclosure provides a computer-implemented method for verifying a configuration of a compute cluster. The compute cluster comprises a plurality of computing entities. Each computing entity is configured to execute one or more respective software components. The method comprises a number of steps. Cluster configuration data representative of the configuration of the compute cluster is obtained. The cluster configuration data comprises first component configuration data representative of a configuration of a first software component executed by a first computing entity of the compute cluster to provide a first service, and second component configuration data representative of a configuration of a second software component executed by a second computing entity of the compute cluster to provide a second service. The cluster configuration data is processed to identify an error relating to an interaction between the first software component and at least one other software component of the compute cluster. In response to identifying the error, verification information identifying the error is generated.

In a further aspect, the present disclosure provides a system for verifying a configuration of a compute cluster. The compute cluster comprising a plurality of computing entities. Each computing entity is configured to execute one or more respective software components. The system comprises a processor, and a memory storing instructions which, when executed by the processor, cause the system to perform a number of steps. Cluster configuration data representative of the configuration of the compute cluster is obtained. The cluster configuration data comprises first component configuration data representative of a configuration of a first software component executed by a first computing entity of the compute cluster to provide a first service, and second component configuration data representative of a configuration of a second software component executed by a second computing entity of the compute cluster to provide a second service. The cluster configuration data is processed to identify an error relating to an interaction between the first software component and at least one other software component of the compute cluster. In response to identifying the error, verification information identifying the error is generated.

In a further aspect, the present disclosure provides a non-transitory processor-readable medium having tangibly stored thereon instructions that, when executed by a processor of a device, cause the device to verify a configuration of a compute cluster according to one or more of the methods described herein In some examples, the verification information comprises a verification report. The method further comprises presenting the verification information to a user via a user output device.

In some examples, the method further comprises modifying at least one of the configuration of the first software component, and the configuration of the second software component, based on the verification information to correct the error.

In some examples, obtaining cluster configuration data comprises: obtaining a configuration file of the first software component from the first computing entity, and processing the configuration file of the first software component to generate the first component configuration data.

In some examples, obtaining cluster configuration data comprises: executing a command on the first computing entity to generate the first component configuration data.

In some examples, processing the cluster configuration data to identify the error comprises: processing the cluster configuration data to generate a representation of the first computing entity, and a representation of the second computing entity; applying a plurality of available functions to the representation of the first computing entity and the representation of the second computing entity; and identifying the error based on the application of the plurality of available functions.

In some examples, the method further comprises obtaining the plurality of available functions. The plurality of available functions comprise a user-defined function defined at least in part by: a clause, and a literal. The literal describes: a key-path paired with an operator, a value to compare against using the operator, and a default value.

In some examples, the cluster configuration data comprises a JavaScript Object Notation (JSON) file.

In some examples, the cluster configuration data further comprises third component configuration data representative of a configuration of a third software component. The third software component and second software component are replica instances providing the second service. The first software component is configured to depend only on the second software component for the second service. The error comprises a misconfiguration of the first software component to depend only on the second software component instead of also being configured to depend on the third software component.

In some examples, the first software component is configured to depend on a third software component. The cluster configuration data does not indicate the presence of the third software component in the compute cluster. The error comprises a misconfiguration of the first software component to depend on the third software component.

In some examples, the first software component does not depend on the second software component for the second service. The cluster configuration data does not indicate a dependence of any other software component on the second software component for the second service. The error comprises the second software component being potentially unnecessary.

In some examples, the cluster configuration data does not indicate a dependence of any other software component on any software component for the second service.

In some examples, the first software component is configured to depend on the second software component for the second service and on a third software component for a third service. Processing the cluster configuration data to identify the error comprises identifying the second service as redundant with the third service. The error comprises a misconfiguration of the first software component to depend on both of the second software component and the third software component.

In some examples, the cluster configuration data further comprises network configuration data representative of a configuration of at least one network interface between the first computing entity and the second computing entity. Processing the cluster configuration data to identify the error includes processing the network configuration data.

In some examples, the first software component is configured to depend on the second software component for the second service. The error comprises a misconfiguration of the network such that the first software component cannot access the second software component.

In some examples, the first component configuration data includes access management data for the first software component indicating one or more rules for user access to the first service. The second component configuration data includes access management data for the second software component indicating one or more rules for user access to the second service. Processing the cluster configuration data to identify the error comprises processing the access management data for the first software component.

In some examples, the first software component depends on the second software component for the second service. The second service is a service providing access to data communicated via the first service. The one or more rules for user access to the first service include a rule disallowing access by a first user. The one or more rules for user access to the second service include a rule allowing access by the first user. The error comprises a misconfiguration of the second software component to allow access to the first user.

BRIEF DESCRIPTION OF THE DRAWINGS

Reference will now be made, by way of example, to the accompanying drawings which show example embodiments of the present application, and in which:

FIG. 4 shows example code of the cluster configuration data of FIG. 2, representing a compute cluster with one computing entity having one software component installed, in JavaScript Object Notation (JSON) format;

FIG. 5 shows example code defining a rule for performing verification of a compute cluster, according to examples described herein;

DETAILED DESCRIPTION

Figure 1:
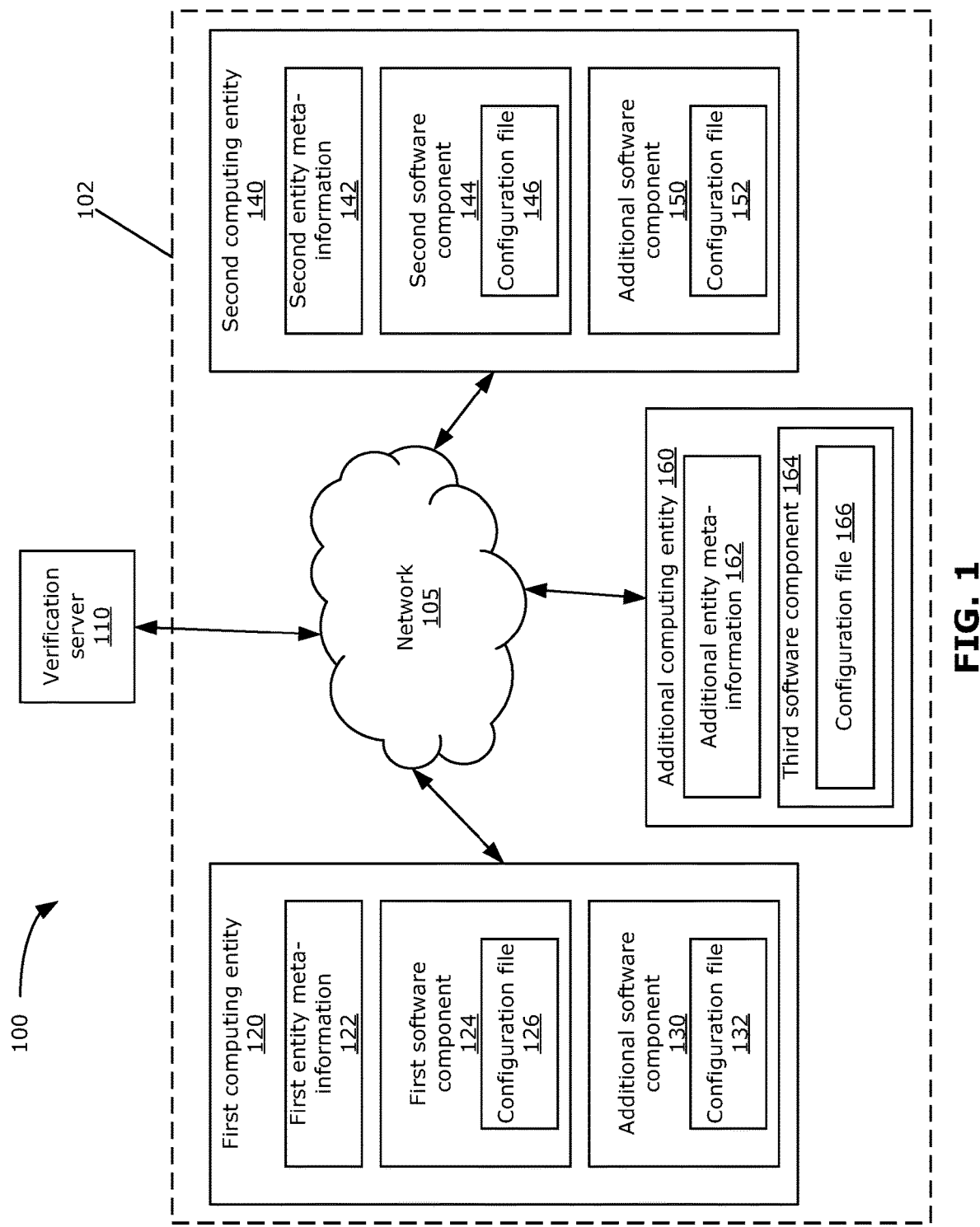
FIG. 1 is a block diagram showing an example system for verification of a compute cluster, including three computing entities of the compute cluster, according to examples described herein.

FIG. 1 shows an example system 100 for verification of a compute cluster 102. The computer cluster 102 is shown to include three computing entities, first computing entity 120, second computing entity 140, and additional computing entity 160, in communication with each other via a network 105. The block diagram of FIG. 1 is an abstraction of the representation of a connected compute cluster. In some embodiments, the computer cluster 102 may include several additional computing entities 160, such that the complete set of computing entities (including and) can be indexed 1 . . . n, wherein the first computing entity 120 corresponds to index value 1, second computing entity 140 corresponds to index value 2, etc. Each computing entity has some respective meta-information (such as its IP address), shown as first entity meta-information 122, second entity meta-information 142, and additional entity meta-information 162. Each computing entity has one or more software components installed in its memory (shown as first software component 124 and additional software component 130 installed on the first computing entity 120, second software component 144 and additional software component 150 installed on the second computing entity 140, and third software component 164 installed on the additional computing entity 160), the configuration of each software component being defined by a respective configuration file 126, 132, 146, 152, 166. It will be appreciated that, in some examples, the configuration of a software component may be defined by two or more configuration files, as described in greater detail below. Each software component may be a software package or application suitable for providing a service to a user or to another service running within or outside of the compute cluster 102. Examples of such software components include databases, authentication and authorization services, streaming services, distributed file systems, and text search services, as described above. In various embodiments, each software components (such as 124, 130, 144, 150, or 164) may be enumerated as software component i.j, wherein i is the index of the computing entity (e.g., 1 . . . n), and j is the index of the software component on the computing entity i.

As described above, a computing entity 120, 140, 160 may be embodied or implemented in various forms in different embodiments, such as, but not limited to, an individual physical computing device or an abstract computational entity such as a container implemented by one or more computing devices or distributed computing platforms.

It will be appreciated that whereas FIG. 1 shows each software component 124, 130, 144, 150, or 164 with configuration information consisting of a single configuration file 126, 132, 146, 152, 166, in some examples a software component may use one or more alternative or additional means to configure itself, such as multiple configuration files, configuration data stored in non-file formats, execution of commends locally or remotely, or reference to a REST (REpresentational State Transfer) endpoint to access configuration information.

In some embodiments, the verification server 110 does not perform its verification operations (as described in detail below) on a live compute cluster 102 as shown in FIG. 1. Instead, the verification server 110 operates on an abstract model of the compute cluster 102 derived from configuration data received from a user, from IaC data, or from another data source. For example, the verification server 110 may operate on configuration data obtained from a source code versioning system. The verification operations may be performed using the data from the source code versioning system to analyze, verify, and/or modify the configuration of the compute cluster 102 before the compute cluster 102 is built (e.g. before the individual computing entities of the compute cluster 102 and their constituent software components are configured, and/or before the network 105 is configured).

FIG. 1 also shows a verification server 110 in communication with the network 105 and thereby in communication with the computer cluster 102. The verification server 110 may in some examples be implemented by one or more computing entities within or outside of the compute cluster 102. Examples of verification servers 110 and their operations will be described below with reference to FIG. 2 and the subsequent figures. Any suitable computing entity or computing platform (such as a distributed computing platform) may be used to perform the functions of the verification server 110 in executing the operations of the cluster verification module 240 described below.

Figure 2:
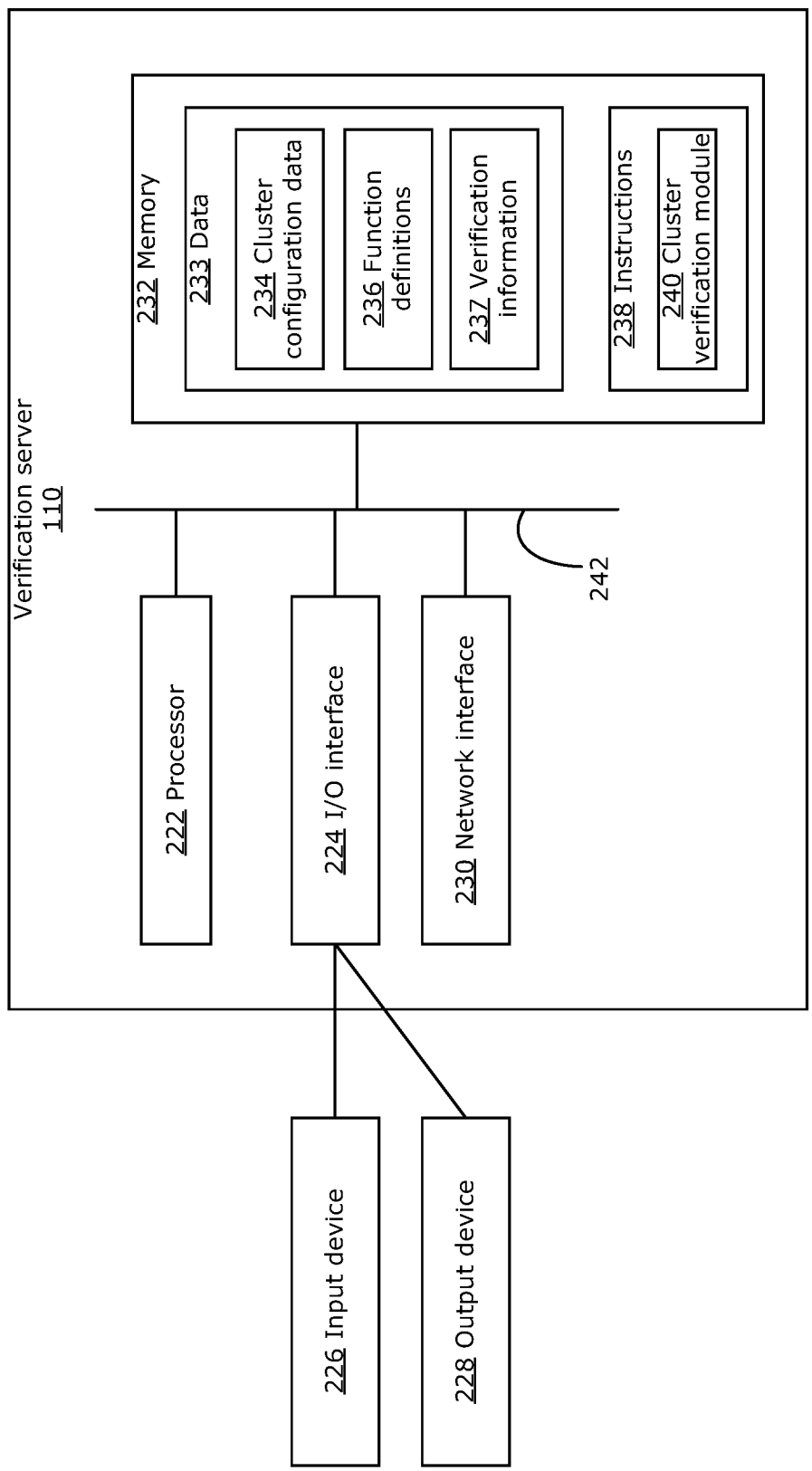
FIG. 2 is a block diagram showing components of an example verification server of the system of FIG. 1.

FIG. 2 is a block diagram illustrating a simplified example verification server 110, such as a computer or a cloud computing platform, suitable for implementing examples described herein, and in particular for executing the method steps and operations described herein. Other examples suitable for implementing example embodiments may be used, which may include components different from those discussed below. Although FIG. 2 shows a single instance of each component, there may be multiple instances of some components in the verification server 110.

The verification server 110 may include one or more processor devices, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof (the processor devices being referred to collectively as a processor 222). The verification server 110 may also include one or more optional input/output (I/O) interfaces (collectively referred to as I/O interface 224), which may enable interfacing with one or more input devices 226 (such as a keyboard, mouse, touchscreen, or camera) and/or output devices 228 (such as a display or speaker).

In the example shown, the input device(s) 226 and output device(s) 228 are shown as external to the verification server 110. However, it will be appreciated that some embodiments may combine one or more of the input devices 226 and/or output devices 228 into a single device or may combine them with the verification server 110.

The verification server 110 may include one or more network interfaces for wired or wireless communication with one or more devices or systems of a network, such as a network (collectively referred to as network interface 230). The network interface 230 may include wired links (e.g., Ethernet cable) and/or wireless links (e.g., one or more antennas) for intra-network and/or inter-network communications. In some embodiments, the verification server 110 may communicate with one or more of the input devices 226 and/or output devices 228 over a network using the network interface 230 instead of the I/O interface 224.

The verification server 110 may include one or more non-transitory memories (collectively referred to as memory 232), which may include a volatile or non-volatile memory (e.g., a flash memory, a random access memory (RAM), and/or a read-only memory (ROM)). The non-transitory memory 232 may store instructions 238 for execution by the processor 222, such as to carry out examples described herein. The memory 232 may also include other processor-executable instructions 238, such as for implementing an operating system and other applications/functions. In some examples, the memory 232 may include instructions 238 for execution by the processor 222 to implement a cluster verification module 240, as described further below. The cluster verification module 240 may be loaded into the memory 232 by executing the instructions 238 using the processor 222.

The memory 232 may also store data 233 used and/or generated by the cluster verification module 240. Cluster configuration data 234 may be obtained, received, and/or generated by the verification server 110, as described below. Function definitions 236, including one or more user-defined function definitions, may be may be obtained, received, and/or generated by the verification server 110, as described below. And verification information 237 may be generated by the cluster verification module 240 and stored in the memory 232, as described below.

In some examples, the verification server 110 may additionally or alternatively execute instructions from an external memory (e.g., an external drive in wired or wireless communication with the verification server 110) or may be provided with executable instructions by a transitory or non-transitory computer-readable medium. Examples of non-transitory computer readable (e.g. processor readable) media include a RAM, a ROM, an erasable programmable ROM (EPROM), an electrically erasable programmable ROM (EEPROM), a flash memory, a CD-ROM, or other portable memory storage.

The verification server 110 may also include a bus 242 providing communication among components of the verification server 110, including those components discussed above. The bus 242 may be any suitable bus architecture including, for example, a memory bus, a peripheral bus or a video bus. It will be appreciated that various components and operations described herein can be implemented on multiple separate devices or systems in some embodiments. In such examples, the bus 242 may be a network link or other communication link enabling communication between multiple devices or components of the system.

In some embodiments, the cluster verification module 240 is executed by the verification server 110 to obtain cluster configuration data 234 associated with the software components, computing entities, and network used by the computer cluster 102. The software components may be dependent on each other in the overall compute cluster 102. The cluster configuration data 234 may be partially or fully derived from some of the configuration files of the software component, e.g. as Infrastructure as Code instructions. The cluster configuration data 234 may be embodied or implemented as one or more documents in various formats (e.g., a document in JavaScript Object Notation (JSON) format, as described below with reference to FIG. 4 below), or in any suitable form that enables the cluster verification module 240 to make the necessary determinations regarding compute cluster configuration or misconfiguration, as described below. The cluster verification module 240 may operate to locate and obtain the respective configuration files for the software components from the computing entities where the software component is executed, thereby extracting from each configuration file the necessary software component configuration data (e.g., first component configuration data for the first software component 124 may be obtained from configuration file 126 located on the first computing entity 120, second component configuration data for the second software component 144 may be obtained from configuration file 146 located on the second computing entity 140, and so on). In some examples, the software component configuration data may include parameters that are set before starting execution of the software component by its respective computing entity, or parameters that are set and updated during run-time. Further information about the computing entities where the software components are running can be provided in some examples, such as operating system-specific information. Examples of such additional information includes host names, operating system versions, and hardware specification and support information.

In some examples, the cluster verification module 240 relies on a set of function definitions 236 to perform verification of the configuration of the computer cluster 102 by executing one or more of the defined functions to verify the compute cluster configuration. Each function defined by the set of function definitions 236 is defined such that, when applied to the cluster configuration data 234, the output of the function identifies one or more errors in the configurations of the software components, network 105, computing entities, or other aspects of the compute cluster 102. The function definitions 236 may be modified or added to over time if detection of additional potential misconfigurations are added to the capabilities of the cluster verification module 240, as described in further detail below.

In some examples, the cluster verification module 240 may include one or more handlers configured to read different configuration file types, and different customizations to standard configuration files, for various software components of the compute cluster 102. These handlers may assist the functions in reading the information from the configuration files correctly.

In some examples, the cluster verification module 240 may support scalability of the verification process to new or customized contexts by enabling the creation of rules written by people without a technical background. These user-defined rules may then be parsed or processed to generate additional user-defined functions, which can be stored as additional user-defined function definitions in the set of function definitions 236. In some examples, users may define simple rules for the overall configuration of an entire compute cluster 102 using a descriptive file format. For example, the descriptive file defining a rule may contain, besides meta-information about the rule (e.g. the name of the rule, a severity level of the rule), a set of clauses $C_1, C_2, \ldots, C_n$, each divided up into literals $l_{i,1}, l_{i,2}, \ldots, l_{i,n}$ for each $C_i$. The evaluation of every clause has to hold true, and each clause is fulfilled if at least one of its literals evaluates to true. This approach is similar to the so-called conjunctive normal form in the field of predicate logic. In some embodiments, the literals contain a way to identify computing entities, software component and the services they provide, and configuration data derived from the configuration files, and are used by the cluster verification module 240 to perform a check using a key-path (e.g. the path to follow in a nested configuration file to get to the value on which a check is performed), an operator o (like equality, greater or smaller, or simply the existence of a specific key), an optional value v to which the actual found configuration value $v$ is compared to using the operator o, and an optional default value d that is applied if the actual value extracted using the key-path is not found in the configuration. An example rule definition is described below with reference to FIG. 5.

In some embodiments, the cluster verification module 240 processes the outputs of the functions to inform a user of the identified errors, and/or to modify the configuration of the compute cluster 102 to correct or mitigate the identified errors. In some embodiments, the cluster verification module 240 generates reports to informs users or other monitoring systems of the overall health of the compute cluster 102 whose configuration has been analyzed and verified. Each error reported in a report may have a different degree of severity (e.g., as defined by the user-defined rules describe above), and in some embodiments certain errors can be selected by a user to be ignored by the reports. For example, a user initiating a cluster verification procedure may instruct the cluster verification module 240 to ignore certain types of errors by selecting certain parameter settings of the cluster verification module 240. In some embodiments, the cluster verification module 240 may operate to modify the configuration of the compute cluster (e.g., modify the network configuration and/or modify the configuration files for the various software components) to correct or mitigate an identified error.

Figure 3:
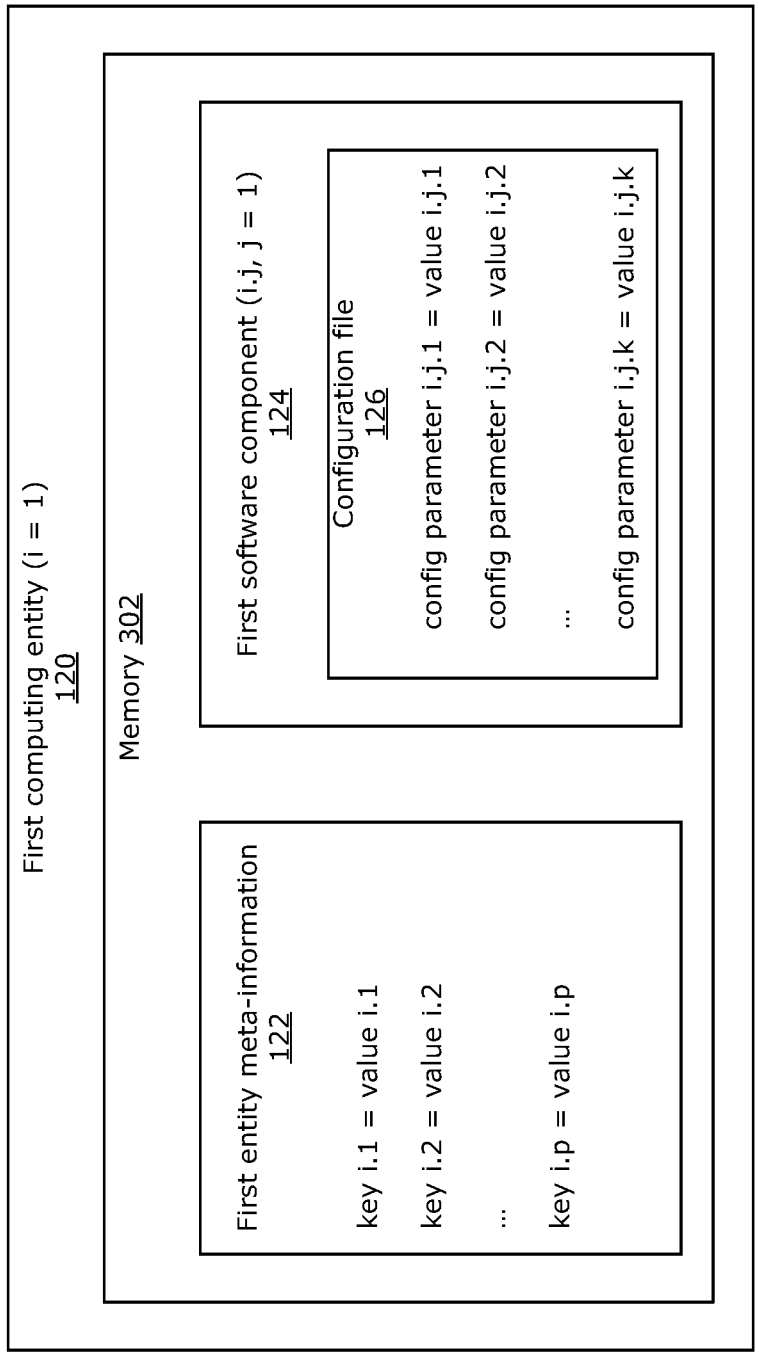
FIG. 3 is a block diagram showing examples of meta-information and configuration file contents for the first computing entity of FIG. 1.

FIG. 3 is a block diagram showing examples of the first device meta-information 122 and configuration file 126 of the first software component 124 stored on the first computing entity 120. The data may be stored in a memory 302 of the first computing entity 120. The computing entity 120 is denoted as computing entity i, as described above. The first device meta-information 122 indicates p values i.1 through i.p for a respective set of p keys i.1 through i.p, The configuration file 126 indicates a set of k values i.j.1 through i.j.k for a respective set of k configuration parameters i.j.1 through i.j.k, providing the basis for the first component configuration data processed by the cluster verification module 240 as part of the cluster configuration data 234.

Several examples of specific configuration error types will now be described. Each described error type may be identified, reported, corrected, and/or mitigated by the cluster verification module 240 in various example embodiments.

In each of the examples described below the cluster verification module 240 operates to verify a configuration of the compute cluster 102. The compute cluster 102 includes a plurality of computing entities, each computing entity being configured to execute one or more respective software components, as described above with reference to FIG. 1. The cluster verification module 240 obtains cluster configuration data 234 representative of the configuration of the compute cluster 102. The cluster configuration data 234 includes first component configuration data representative of a configuration of the first software component 124 executed by the first computing entity 120 to provide a first service, and second component configuration data representative of a configuration of the second software component 144 executed by the second computing entity 140 to provide a second service. The cluster verification module 240 processes the cluster configuration data 234 to identify an error relating to an interaction between the first software component 124 and at least one other software component of the compute cluster 102. In response to identifying the error, the cluster verification module 240 generates verification information 237 identifying the error.

FIRST EXAMPLE

Some errors identified by the cluster verification module 240 are errors relating to the interconnections between software components on different computing entities. In this example, a Kerberos Key Distribution Center (KDC) is a software component of the computer cluster 102. The KDC, as well as a replica instance of the KDC, are running on two different computing entities within the compute cluster 102 (e.g., second computing entity 140 and additional computing entity 160), and the two replica instances provide an authentication service to other software components of the compute cluster 102. The primary instance (running on second computing entity 140) is denoted KDC1, and the replica instance (running on additional computing entity 160) is denoted KDC2. KDC1 is reachable using the domain name kdc1.coguard.io, and KDC2 should have the domain name kdc2.coguard.io.

Each software component of the computer cluster 102 that depends on these KDCs for authentication should have in its krb5.conf file (e.g. a configuration file denoting dependence on the authentication service) lines of code in the following form:

```
[realms]
REALM.GOGUARD.IO = {
kdc = kdc1.coguard.io
kdc = kdc2.coguard.io admin_server = kerberos.coguard.io
}
```

If the compute cluster 102 contains such two KDC instances with such a replication relation, and the krb5.conf of a software component in the compute cluster 102 (e.g., first software component 124 running on first computing entity 120) shows only one of them in its configuration file 126, for example as in the following code snippet:

```
[realms]
REALM.GOGUARD.IO = {
kdc = kdc1.coguard.io
admin_server = kerberos.coguard.io
}
``` then this may be identified as an error by the cluster verification module 240, since the first software component 124 needs to be aware of the primary instance KDC1 as well as the replica instance KDC2 for failover functionality to work properly if the primary instance KDC1 goes offline for some reason.

Notice that this error would have not been caught if only the krb5.conf file was analyzed in isolation, without considering cluster configuration data 234 pertaining to the whole compute cluster 102.

Thus, in some embodiments, the cluster verification module 240 operates as follows: first, the cluster verification module 240 obtains cluster configuration data 234 representative of the configuration of the compute cluster 102. The cluster configuration data 234 includes first component configuration data (e.g., derived from configuration file 126) representative of a configuration of a first software component (e.g. first software component 124) executed by a first computing entity 120 of the compute cluster 102 to provide a first service. The cluster configuration data 234 also includes second component configuration data representative of a configuration of a second software component 144 (e.g., KDC1) executed by a second computing entity 140 of the compute cluster 102 to provide a second service (e.g., the Kerberos Key Distribution Center authentication service). The cluster configuration data 234 also includes third component configuration data representative of a configuration of a third software component 164; the third software component 164 and second software component 144 are replica instances providing the second service (e.g., the Kerberos Key Distribution Center authentication service). The first software component 124 is configured to depend only on the second software component 144 for the second service (e.g., the Kerberos Key Distribution Center authentication service). The cluster verification module 240 processes the cluster configuration data 234 to identify an error relating to an interaction between the first software component 124 and at least one other software component of the compute cluster (e.g., second software component 144 and third software component 164 in this example). In this example, specifically, the error comprises a misconfiguration of the first software component 124 to depend only on the second software component 144 instead of also being configured to depend on the third software component 164.

In response to identifying the error, the cluster verification module 240 generates verification information 327 identifying the error. The verification information 327 may be stored to the memory 232 as shown in FIG. 2. The verification information 327 may also be processed to generate a report for presentation to a user via a user output device 228, e.g. for display on a display device.

SECOND EXAMPLE

A second example is now described, which is similar to the first example above, using the same set of assumptions, except that the compute cluster 102 as represented by the cluster configuration data 234 does not contain KDC2 (e.g., does not contain the third software component 164).

If a software component (e.g., first software component 120) is found which has the lines

```
[realms]
REALM.GOGUARD.IO = {
kdc = kdc1.coguard.io
kdc = kdc2.coguard.io
admin_server = kerberos.coguard.io
}
``` in its source code, e.g. its configuration file 126 contains a reference to a second KDC under the domain kdc2.coguard.io, then an error may be identified by the cluster verification module 240 because the compute cluster 102 does not contain any computing entity, virtual or physical, which can be accessed via kdc2.coguard.io. e.g., either the cluster configuration data 234 is incomplete, or the first software component's 124 krb5.conf file contains a reference to a non-existing KDC instance.

Thus, in some examples, the first software component 124 is configured to depend on a third software component 163, but the cluster configuration data 234 does not indicate the presence of the third software component 164 in the compute cluster 102. In this case, the error comprises a misconfiguration of the first software component 124 to depend on the third software component 164.

THIRD EXAMPLE

In some examples, a certain software component's dependency on a different software component in a compute cluster 102 disappears in later versions. A current example is the streaming service Kafka, which in versions prior to 2.8.0 depended on the distributed synchronization service Zookeeper being installed and available inside the compute cluster 102 as well, but any Kafka installation of version 2.8.0 and above does not depend on Zookeeper any longer.

Consider, in this example, the compute cluster 102 includes n instances of Zookeeper, $z_1, \ldots, z_n$ (i.e., n software components providing the Zookeeper service installed on one or more of the computing entities of the compute cluster 102), and m instances of Kafka, $k_1, \ldots, k_m$ (i.e., m software components providing the Kafka service installed on one or more of the computing entities of the compute cluster 102). Assume that all Kafka installations $k_1, \ldots, k_m$ are of version 2.8.0 and above, and do not contain any reference to any of the Zookeeper instances $z_i$ in their configuration files (e.g., 126) or the meta-information of their respective computing entities (e.g., 122). If no other software component in the compute cluster 102 references the Zookeeper instances $z_i$ at all, the cluster verification module 240 may identify an error indicating that the Zookeeper instances $z_i$ may be superfluous, redundant, or otherwise unnecessary.

Thus, in this example, the first software component 124 (e.g. a first Kafka instance $k_1$) does not depend on the second software component 144 (e.g., a first Zookeeper instance $z_1$) for the second service (e.g., the Zookeeper service), and the cluster configuration data 234 does not indicate a dependence of any other software component on the second software component 144 for the second service. The error comprises the second software component being potentially unnecessary. In some examples, more specifically, the rule for identifying the error may require the cluster configuration data to not indicate a dependence of any software component on any software component for the second service (e.g., no software component of the compute cluster 102 is dependent on any of the Zookeeper instances $z_1, \ldots, z_n$).

FOURTH EXAMPLE

In this example, assume the facts of the third example above. In this example, the new version of Kafka (e.g. version 2.8.0 and above) uses a quorum service to provide the functionality previously provided by Zookeeper in older version of Kafka. The quorum service is identified by a key such as controller.quorum.voters in the configuration file (e.g. 126) for the Kafka installation (e.g., first software component 124). Assume that the configuration file 126 for each Kafka instance has both the keys controller.quorum.voters, as well as zookeeper.connect (e.g. a key indicating dependence on the second software component 144). For example, the Kafka instances are configured to depend on the deprecated technique, as well as the new technique. In this example, an error should be identified by the cluster verification module, as only one of the dependencies should be present, the other dependency being superfluous.

Thus, in some examples, the first software component 124 (e.g. a Kafka installation) is configured to depend on the second software component 144 (e.g. a Zookeeper instance) for the second service and on a third software component 164 (e.g. a quorum software component) for a third service (e.g. the quorum service). When the cluster verification module 240 processes the cluster configuration data 234 (specifically the first component configuration data derived from configuration file 126), it identifies the second service (e.g. Zookeeper) as redundant with the third service (e.g. the quorum service), thereby identifying as an error the misconfiguration of the first software component 124 to depend on both of the second software component 144 and the third software component 164.

FIFTH EXAMPLE

This example assumes the same facts as the first example above, and further assumes that KDC1 (e.g. second software component 144) and KDC2 (e.g. third software component 164) are configured to accept connections at TCP/IP port 88, which is standard for KDC.

Furthermore, the hosts of KDC1 and KDC2 (e.g. second computing entity 140 and additional computing entity 160) are defined by their respective meta-information 142, 162 as part of a network subnet S, and S uses the address prefixes defined by the following network in IPv4 CIDR notation: 10.10.10.1/22. This means S has 1024 addresses that can be allocated. In addition, the hosts of KDC1 and KDC2 allow only a subset A of all IP addresses in S to connect via port 88. Let $\bar{A}$ denote all the other addresses in S which are not included A. The data defining data defining S, A and $\bar{A}$ may be obtained from one or more devices or computing entities in the compute cluster 102, such as switches, routers, or other nodes in the network 105.

Now, assume that a software component hosted by a compute device belonging to S with an IP address in $\bar{A}$ (e.g., first software component 124 running on first computing entity 120, wherein the first entity meta-information 122 defines the IP address of the first computing entity 120 as being in $\bar{A}$) is using KDC1 and KDC2 for authentication, e.g. it has lines as the following in its krb5.conf file:

```
[realms]
REALM.COGUARD.IO = {
kdc = kdc1.coguard.io
kdc = kdc2.coguard.io
admin_server = kerberos.coguard.io
}
```

In this example, the service implemented by the first software component 124 will not be able to connect to either of the KDCs, because traffic on port 88 from IP addresses belonging to $\bar{A}$ is blocked on hosts of KDC1 and KDC2 (e.g. second computing entity 140 and additional computing entity 160). In some embodiments, the cluster verification module 240 may include a rule for identifying such errors, relying on network configuration data (e.g. the data defining subnet S and IP address subsets A and $\bar{A}$) as well as the configuration files.

Thus, in some examples, the cluster configuration data 234 further comprises network configuration data representative of a configuration of at least one network interface between the first computing entity 120 and the second computing entity 140. When the cluster verification module 240 processes the cluster configuration data 234 to identify errors, this processing includes processing the network configuration data. In this example, the first software component 124 is configured to depend on the second software component 144 for the second service (e.g. KDC), and the error identified in this example is a misconfiguration of the network 105 such that the first software component 124 cannot access the second software component 144.

SIXTH EXAMPLE

In this example, a service S in a compute cluster 102 (e.g., the first service provided by the first software component 124) can be accessed by a set of n users $u_1, \ldots, u_n$. The first service S stores its information using a storage service $\mathcal{S}$ (e.g., a database, an object storage system, or some other data storage service providing access to data communicated via the first service). In this example, the data storage service $\mathcal{S}$ is the second service provided by the second software component 144. In turn, $\mathcal{S}$ is configured (e.g., by configuration file 146) to allow access by users $\textit{u}_1, \ldots, \textit{u}_n$, with at least one such user $\textit{u}_i$ not being one of the first set $u_1, \ldots, u_n$. This means that the user $\textit{u}_j$, despite not having access to service S (e.g. first software component 124), can access the backend service $\mathcal{S}$ of S and thereby obtain information that the user is not authorized to have, if following the access rules of S strictly.

In some examples, the function definitions 236 may contain a function to identify this error, as the cluster verification module 240 can verify the configurations of both S and $\mathcal{S}$ individually, and also determine through the configuration of first software component 124 (providing service S) that $\mathcal{S}$ (provided by second software component 144) is the backend storage service for the first software component 124 and compare identity and access management configurations for both software components 124, 144.

Thus, in some examples, the first component configuration data includes access management data for the first software component 124 indicating one or more rules for user access to the first service, and the second component configuration data includes access management data for the second software component 144 indicating one or more rules for user access to the second service. When processing the cluster configuration data 234 to identify the error, the cluster verification module 240 processes the access management data for the first software component 124. The first software component 124 depends on the second software component 144 for the second service, and the second service is a service providing access to data communicated via the first service. The one or more rules for user access to the first service include a rule disallowing access by a first user, but the one or more rules for user access to the second service include a rule allowing access by the first user. Thus, the error identified by the cluster verification module 240 may include identification of a misconfiguration of the second software component 144 to allow access to the first user.

Example Implementation

Examples of implementation details for the cluster verification module 240 and the various types of data used thereby will now be described.

Some software components use customized or unconventional versions of standard configuration file types. The configuration specification of the MongoDB software package provides an example. While MongoDB's main configuration uses the YAML ("YAML Ain't Markup Language", originally "Yet Another Markup Language") file format, it allows for two additional keys: _rest and _exec. These allow for configuration values to come from calls to REST (REpresentational State Transfer) endpoints or execution of commands on the host computing entity, which is not standard for the YAML specification. Thus, in some example embodiments, the cluster configuration data 234 is obtained by obtaining a configuration file of the first software component from the one or more of the computing entities of the compute cluster 102 and processing the configuration file(s) to generate the cluster configuration data 234 (specifically, e.g., processing the processing the configuration file 126 of the first software component 120 to generate the first component configuration data of the cluster configuration data 234). However, in some examples, at least part of the cluster configuration data 234 is obtained by executing a command on the first computing entity 120 to generate the first component configuration data. In other examples, the cluster configuration data 234 is obtained at least in part by accessing a REST endpoint.

In some embodiments, a representation of the compute cluster 102 is generated and used to store information about the computing entities of the computer cluster 102, their interconnection, and the software components that are subject to verification. The representation can be achieved by application of visual tools or description in any suitable format.

FIG. 4 shows an example of code 400 representing a compute cluster, for example as part of the cluster configuration data 234 for a compute cluster including one computing entity ("machine1") with one software component ("Kerberos") installed. The code 400 references two configuration files for the software component ("./krb5.conf" and "./kdc.conf"). In some embodiments, the code 400 is mapped from a provided Infrastructure as Code configuration. In various embodiments and examples, the code 400 or other representation of the compute cluster may be provided by a user, by software running on the verification server 110, by a computing entity of the compute cluster 102, or through some other means. Furthermore, certain meta-information about the compute cluster or its constituent computing entities may be derived from the cluster configuration data 234, such as information obtained from the configuration files of the various software components.

The functions, or other executable descriptions of rules, may be implemented in various ways in different embodiments. Each function may take a cluster representation (e.g. code 400) as input, and output a report if either a single software component configuration or some combinations of software component configurations contain errors. In some embodiments, the set of functions is extensible by user-defined functions and/or rules. The function definitions 236 may be stored as the user-defined rules, and/or as processor-executable code for implementing the rules.

In some embodiments, a pre-processor is used by the cluster verification module 240 for parsing configuration files (e.g., configuration file 126). If a software component identified in the code 400 as part of the compute cluster 102 is either using a custom configuration file format, or is using a configuration file that slightly deviates from a standard file format, then the non-standard configuration file must be pre-processed. The pre-processor ensures that the functions obtain the correct representation of the configuration file before processing the configuration information to identify errors.

In some embodiments, some or all of the functions can be formulated using a descriptive language, similar to the conjunctive normal form in the field of predicate logic. One potential benefit of such an approach lies in the abstraction of the specific file-type. This may enables a user to quickly write rules with no knowledge about the underlying file-formats being used. Furthermore, such an approach can address different software components within the same compute cluster, evaluate their configurations, and create a simple way to justify the failure of the rule.

FIG. 5 shows user-defined code defining a rule 500, which may be implemented or verified using one or more functions of the cluster verification module 240. The rule 500 is written as a predicate. This specific example targets the krb5.conf configuration file of any Kerberos application. It checks if the key default_tkt_enctypes inside the libdefaults section of the configuration file exists, and fails if it does. In this example, the value parameter, as well as the default parameter are not set.

In order to support nested configurations, the descriptive language used to define the rule 500 allows for a key-path which evaluates keys appearing along a logical nested path inside the configuration file, as part of the literals. At times, keys are custom defined by the user of the software component. In order to support this scenario with the descriptive language as outlined above, the cluster verification module 240 may allow keys in the key-path to be objects containing abstractions of the key they represent. In some embodiments, these will be stored as JSON objects, containing at least a keyType field and a key. The keyType field describes how to evaluate the key and compare it to the keys found in an actual path.

An example would be REGEX, describing a regular expression. The key is written as a textual representation of the specific key-type. In the example of a REGEX, it would be a regular expression evaluated on the encountered keys at the current level of the key-path. The user can then specify if all the valid paths for this special key have to be fulfilled, or only a subset. Moreover, it is also allowed to define how many levels deep the matching of the key inside the Key-Path is possible, if custom nesting is supported in the given configuration.

An example version of a schema for such a rule descriptive language in JSON format is given as follows (using the JSON schema format, as defined at http://json-schema.org):

```
{
"definitions" : {
  "keyObject" : {
    "type" : "object",
    "description":"A general object describing a special object in the key-path inside
    a literal.",
    "properties" : {
      "key" : {
        "type" : "string",
        "description":"The key, formatted in a way as defined by the
        keyType enumeration."
      "keyType" : {
        "description":"Enum capturing the type of algorithm to be used
        for the interpretation of the key.",
        "enum": [
        "REGEX",
        "LISTREDUCER",
        "STRING"
        ]
      }
}
```

-continued

```
        "levelsMatching": {
          "type":"integer ",
          "description":"Describes how many levels deep the matching of
          this key still goes to remain a valid key path. Default is 1, and 0 means
          infinite. ",
          "default": 1,
          "minimum": 0
        }
      }
    }
  },
  "clause": {
    "description":"A clause contains an array of literals, as defined below. ",
    "type" :"object",
    "properties" : {
      "literals" : {
        "type" :"array " ,
        "items" : {
          "$ref": "#/definitions/literal"
        }
      }
    }
  }
  "literal": {
    "type" : "object",
    "description": "A literal is the smallest possible entity of a rule. It defines keys
    and the properties of the values in configuration files and defines the conditions
    under which a rule written in this format will fail or not.",
    "properties": {
      "service {"type":"string"},
      "configurationFile {"type":"string"}
      "keyPath": {
        "type":"array":"items {
          "anyOf": [
            {"type":"string" },
            {"#ref":"#/definitions/keyObject" }
          ]
        }
      },
      "operator": {"$ref":"#/definitions/operator"},
      "value": {"type":"string"},
      "default": {"type":"string"}
    },
  },
  "operator" : {
    "description":"The supported set of operators to compare a value to a given
    expression.",
    "enum" : [
      "keyShouldExist",
      "keyShouldNotExist",
      "is",
      "isNot",
      "all",
      "contains" ,
      "containsNot",
      "matches" ,
      "matchesNot",
      "matchesSome" ,
      "matchesNone" ,
      "matchesAll",
      "greater" ,
      "smaller"
    ]
  }
},
"type":"object",
"description": "A rule is a collection of clauses, evaluated in conjunction",
"properties": {
  "identifier": {"type":"string"},
  "severity": {"type":"integer", "minimum": 1, "maximum": 5},
  "documentation": {"type":"string"},
  "clauses" : {
    "type" : "array" ,
    "items" : {
      "$ref" : "#/definitions/clause"
    }
  }
 }
}
```

Some embodiments, given a schema like the above defining the creation of user-defined rules, only need to implement the evaluation of such rules for a configuration file type once, and the authors of the rules do not have address the details of parsing of the configuration file types and their correct evaluation; instead, users defining such rules may simply address the substance and purpose of the rules themselves at a high level of abstraction. Such a schema may provide broad coverage of different possible rule types described using such a language, and may leave only certain complicated cases which require additional rules coded at a lower level of abstraction to address specific technical details of various configuration file types or other idiosyncratic technical details. Such lower-level rules may be implemented as functions in a conventional programming language.

Thus, in some embodiments, the cluster verification module 240 operates to obtain the plurality of available functions, including one or more a user-defined functions. Each user-defined function may be defined at least in part by a clause and a literal, wherein the literal describes a key-path paired with an operator, a value to compare against using the operator, and a default value.

In some embodiments, at least one representation of a compute cluster is stored, and the set of functions is applied to each representation. The application of these functions by the cluster verification module 240 may result in the generation of one or more reports or other verification information, which may be stored in memory and/or directly presented to a user via a user output device. These reports can be generated repeatedly, and configurations of various software components, network interfaces, and/or computing entities of the compute cluster 102 can be changed to correct or mitigate the errors identified by the reports, either automatically or through user action.

Figure 6:
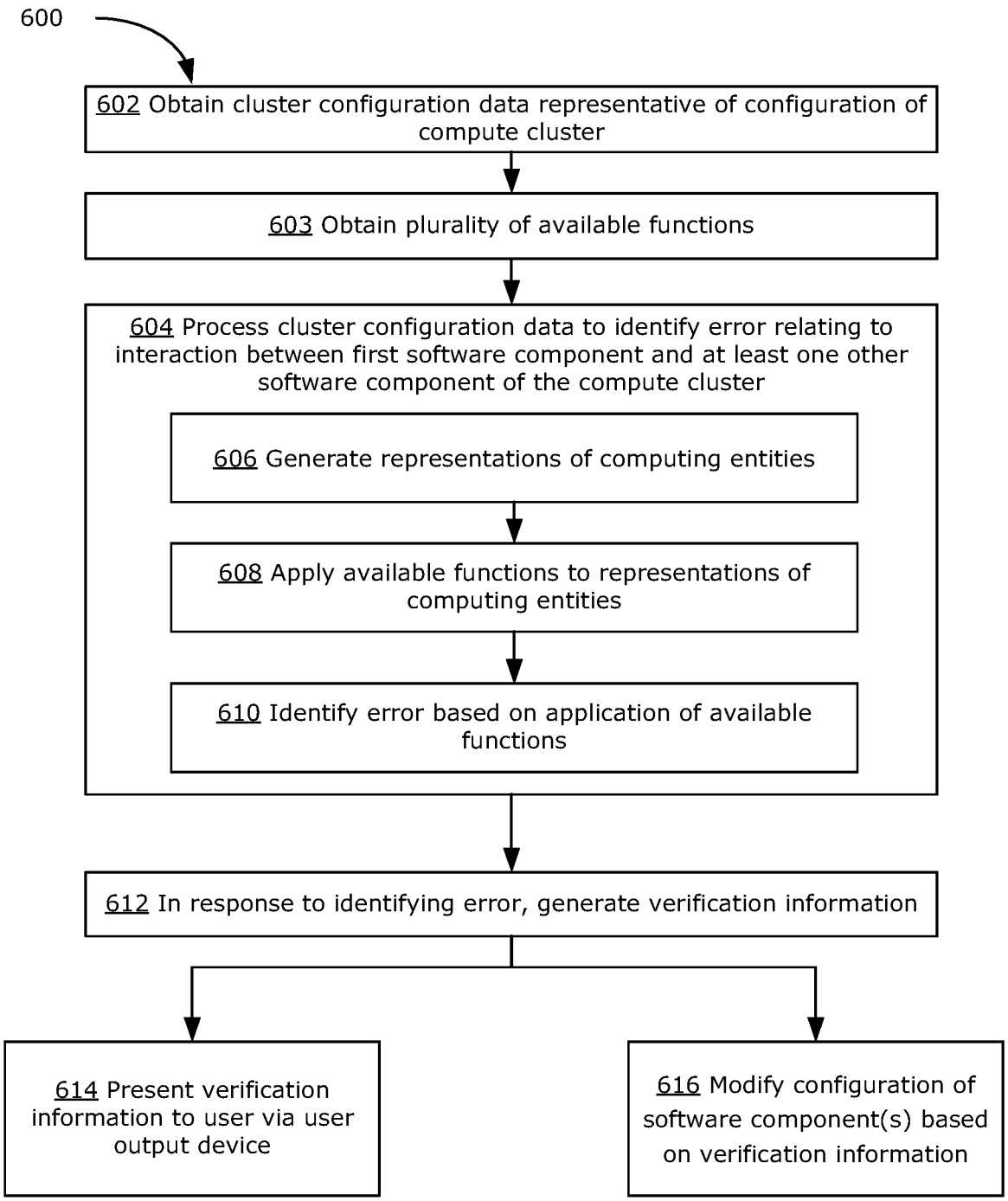
FIG. 6 is a flowchart showing steps of an example method for verifying a compute cluster, according to examples described herein.

FIG. 6 shows an example method 600 for verifying a compute cluster, as described above. The method 600 is described in the context of the example compute cluster 102 and verification server 100 described above.

At 602, the cluster verification module 240 obtains cluster configuration data 234 representative of the configuration of the compute cluster 102. The cluster configuration data 234 includes first component configuration data representative of a configuration of the first software component 124 executed by the first computing entity 120 to provide a first service, and second component configuration data representative of a configuration of the second software component 144 executed by the second computing entity 140 to provide a second service.

At 603, the cluster verification module 240 obtains the function definition data 236 defining the plurality of available functions.

At 604, the cluster verification module 240 processes the cluster configuration data 234 to identify an error. Step 604 includes sub-steps 606, 608, and 610 in the illustrated method 600.

At 606, representations of the computing entities are generated, such as code 400 described above.

At 608, the available functions (defined by the function definitions 236) are applied to the representations of the computing entities.

At 610, as a result of the application of the available functions, at least one error is identified in the cluster configuration data, relating to an interaction between the first software component 124 and at least one other software component of the compute cluster 102.

At 612, in response to identifying the error, the cluster verification module 240 generates verification information 237 identifying the error.

Step 612 may be followed by step 614 and/or step 616. At 614, the verification information 237 is presented to a user via a user output device as a report. At 616, the verification information is used by the cluster verification module 240 or another software module to modify the configuration of the compute cluster 102, e.g., by modifying one or more of the configuration files of the software components of the computer cluster 102 to mitigate and/or correct the identified error(s), either automatically or aided by further user input.

Figure 7:
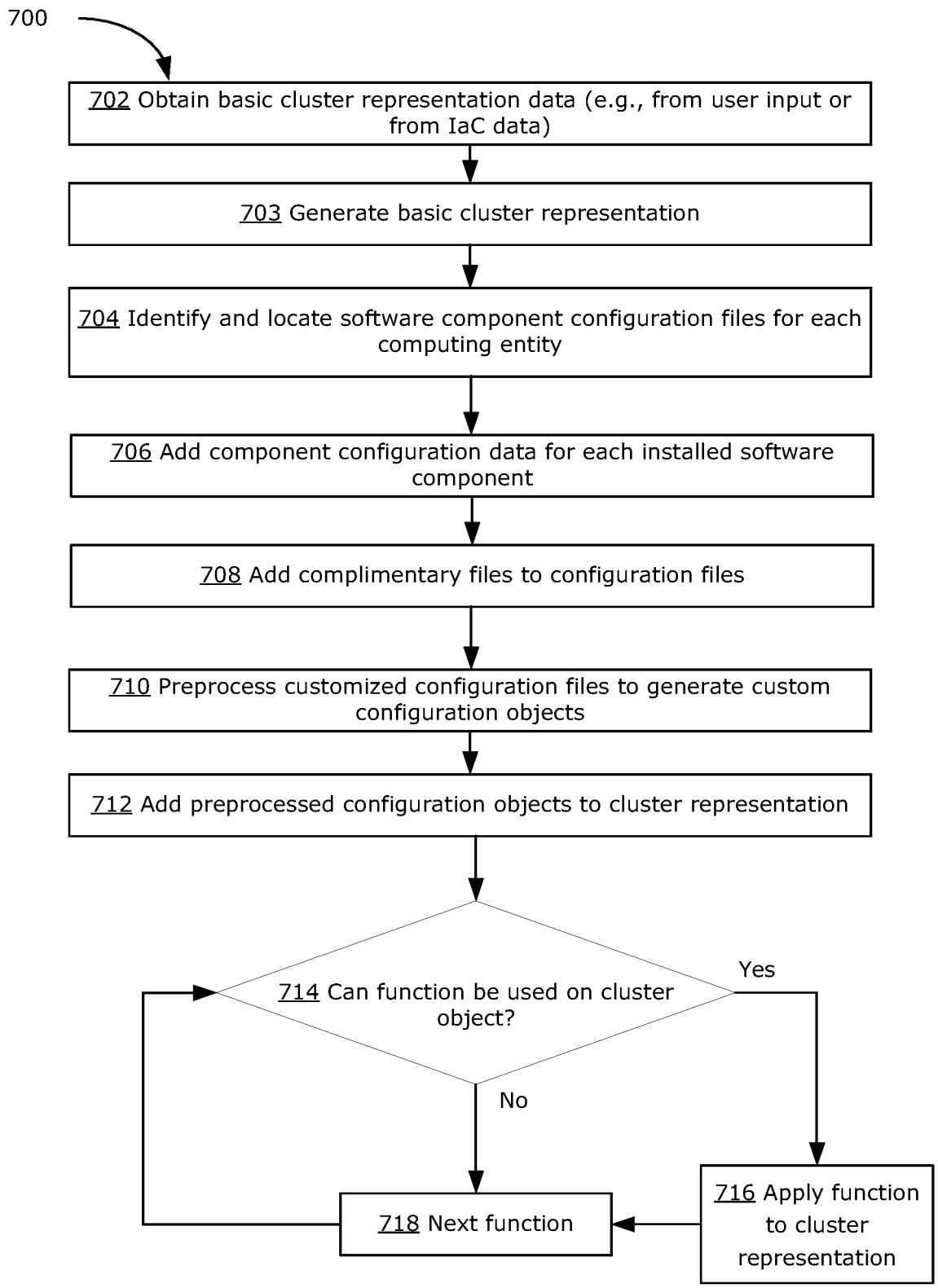
FIG. 7 is a flowchart showing steps of a second example method for verifying a compute cluster, according to examples described herein.

FIG. 7 shows a second method 700 for verifying a compute cluster, showing an alternative embodiment in the context of the example compute cluster 102 and verification server 100 described above.

At 702, a basic outline of the cluster is obtained, by obtaining basic cluster representation data. In various embodiments, the basic cluster representation data may be received manually (e.g. from user input) and/or via interpretation of IaC instructions.

At 703, the basic cluster representation data is processed by the cluster verification module 240 to generate a basic cluster representation.

At 704, additional information about software components installed on each computing entity in the compute cluster can be obtained from user input and/or other data sources. This additional information may be used by the cluster verification module 240 to identify and locate software component configuration files for each software component of the compute cluster 102.

At 706, the configuration files for each software component are processed to add component configuration data to the basic cluster representation.

At 708, complimentary files which may accompany the software component configuration files (e.g., files included via include-directives) are also located and processed to add information to the basic cluster representation.

At 710, the configuration files are parsed by a preprocessor as described above to generate custom configuration objects.

At 712, the custom configuration objects are used to add further information to the basic cluster representation.

Steps 702 through 712 correspond roughly to step 602 of method 600. The final cluster representation generated thereby may be regarded as equivalent to the cluster configuration data 234.

At 714, the cluster verification module 240 determines if a function (of the plurality of functions defined by the function definition data 236) can be used in the specific case of the cluster as represented by the now-complete cluster representation generated in steps 702-712.

If the function can be applied to the compute cluster, the method 700 proceeds to step 716, otherwise it proceeds to step 718.

At 716, the function is applied to the cluster representation to generate a result, e.g. verification information. The method 700 then proceeds to step 718.

At 718, the next function is evaluated, returning to step 714.

Steps 714, 716, and 718 may be repeated to evaluate all functions and apply all such functions that are applicable to the compute cluster 102 as represented by the cluster configuration data 234. Steps 714, 716, and 718 correspond roughly to step 604 of method 600.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the example embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of example embodiments may be implemented in a form of a software product. The software product is stored in a storage medium, and includes several instructions for instructing a computer device (which may be a personal computer, a server, or a network device) to perform all or some of the steps of the methods described in the example embodiments. The foregoing storage medium includes any medium that can store program code, such as a Universal Serial Bus (USB) flash drive, a removable hard disk, a read-only memory (Read-Only Memory, ROM), a random access memory (Random Access Memory, RAM), a magnetic disk, or an optical disc.

In the described methods or block diagrams, the boxes may represent events, steps, functions, processes, modules, messages, and/or state-based operations, etc. While some of the example embodiments have been described as occurring in a particular order, some of the steps or processes may be performed in a different order provided that the result of the changed order of any given step will not prevent or impair the occurrence of subsequent steps. Furthermore, some of the messages or steps described may be removed or combined in other embodiments, and some of the messages or steps described herein may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The described embodiments are considered to be illustrative and not restrictive. Example embodiments described as methods would similarly apply to systems or devices, and vice-versa.

The various example embodiments are merely examples and are in no way meant to limit the scope of the example embodiments. Variations of the innovations described herein will be apparent to persons of ordinary skill in the art, such variations being within the intended scope. In particular, features from one or more of the example embodiments may be selected to create alternative embodiments comprises of a sub-combination of features which may not be explicitly described. In addition, features from one or more of the described example embodiments may be selected and combined to create alternative example embodiments comprised of a combination of features which may not be explicitly described. Features suitable for such combinations and sub-combinations would be readily apparent to persons skilled in the art upon. The subject matter described herein intends to cover all suitable changes in technology.

The invention claimed is:

1. A computer-implemented method for verifying a configuration of a compute cluster, the method comprising:
obtaining cluster configuration data representative of the configuration of the compute cluster, wherein the compute cluster comprises a plurality of computing entities including a first entity and a second entity, each computing entity being a node configured to execute one or more respective software components of a plurality of software components, the plurality of software components including a first software component and a second software component, the cluster configuration data comprising:
first component configuration data representative of a configuration of the first software component executed by the first computing entity of the compute cluster to provide a first service, the first component configuration data being derived from a first configuration file of the first software component and including a first address used by the first software component; and
second component configuration data representative of a configuration of the second software component executed by the second computing entity of the compute cluster to provide a second service, the second component configuration data being derived from a second configuration file of the second software component and including a second address used by the second software component;
prior to deployment of the first software component and the second software component, processing the cluster configuration data to identify an error in the cluster configuration data, based on the first address or the second address being previously unknown in the configuration of the compute cluster, the error relating to a service-level dependency between the first software component and at least one other software component of the compute cluster, wherein processing the cluster configuration data to identify the error comprises:
processing the cluster configuration data to generate:
a representation of the first computing entity; and
a representation of the second computing entity;
obtaining a plurality of available functions, the plurality of available functions comprising a user-defined function defined at least in part by:
a clause, and
a literal;
applying the plurality of available functions to the representation of the first computing entity and the representation of the second computing entity; and
identifying the error based on the application of the plurality of available functions; and
in response to identifying the error, generating verification information associated with the error.

2. The method of claim 1,
wherein the verification information comprises a verification report; and
further comprising:
presenting the verification information to a user via a user output device prior to deployment of the software application.

3. The method of claim 1, further comprising:
modifying at least one of:
the configuration of the first software component; or
the configuration of the second software component
based on the verification information to correct the error.

4. The method of claim 1, wherein obtaining cluster configuration data comprises:
obtaining the first configuration file of the first software component from the first computing entity; and processing the first configuration file of the first software component to generate the first component configuration data.

5. The method of claim 1, wherein obtaining cluster configuration data comprises:
executing a command on the first computing entity to generate the first component configuration data.

6. The method of claim 1, wherein:
the cluster configuration data comprises a JavaScript Object Notation (JSON) file.

7. The method of claim 1, wherein:
the cluster configuration data further comprises third component configuration data representative of a configuration of a third software component;
the third software component and second software component are replica instances providing the second service;
the first software component is configured to depend only on the second software component for the second service; and
the error comprises a misconfiguration of the first software component to depend only on the second software component instead of also being configured to depend on the third software component.

8. The method of claim 1, wherein:
the first software component is configured to depend on a third software component;
the cluster configuration data does not indicate the presence of the third software component in the compute cluster; and
the error comprises a misconfiguration of the first software component to depend on the third software component.

9. The method of claim 1, wherein:
the first software component does not depend on the second software component for the second service;
the cluster configuration data does not indicate a dependence of any other software component on the second software component for the second service; and
the error comprises the second software component being potentially unnecessary.

10. The method of claim 9, wherein:
the cluster configuration data does not indicate a dependence of any other software component on any software component for the second service.

11. The method of claim 1, wherein:
the first software component is configured to depend on the second software component for the second service and on a third software component for a third service;
processing the cluster configuration data to identify the error comprises:
identifying the second service as redundant with the third service; and
the error comprises a misconfiguration of the first software component to depend on both of the second software component and the third software component.

12. The method of claim 1, wherein:
the cluster configuration data further comprises network configuration data representative of a configuration of at least one network interface between the first computing entity and the second computing entity; and
processing the cluster configuration data to identify the error includes processing the network configuration data.

13. The method of claim 12, wherein:
the first software component is configured to depend on the second software component for the second service; and
the error comprises a misconfiguration of the network such that the first software component cannot access the second software component.

14. The method of claim 1, wherein:
the first component configuration data further includes access management data for the first software component indicating one or more rules for user access to the first service;
the second component configuration data further includes access management data for the second software component indicating one or more rules for user access to the second service; and
processing the cluster configuration data to identify the error further comprises processing the access management data for the first software component.

15. The method of claim 14, wherein:
the first software component depends on the second software component for the second service;
the second service is a service providing access to data communicated via the first service;
the one or more rules for user access to the first service include a rule disallowing access by a first user;
the one or more rules for user access to the second service include a rule allowing access by the first user; and
the error comprises a misconfiguration of the second software component to allow access to the first user.

16. The method of claim 1,
wherein the first component configuration data includes the first address used by the first software component, a first communication protocol used by the first software component, and a first amount of memory being allocated to the first software component.

17. The method of claim 1, further comprising:
normalizing the plurality of available functions using a descriptive language.

18. The method of claim 1, wherein the error comprises at least one of:
preventable downtime of the compute cluster, the first software component, or the second software component;
unauthorized access to the compute cluster, the first software component, or the second software component; or
violation of zero trust principle.

19. A system for verifying a configuration of a compute cluster, the system comprising:
a processor; and
a memory storing instructions which, when executed by the processor, cause the system to:
obtain cluster configuration data representative of the configuration of the compute cluster, wherein the compute cluster comprises a plurality of computing entities including a first entity and a second entity, each computing entity being a node configured to execute one or more respective software components of a plurality of software components, the plurality of software components including a first software component and a second software component, the cluster configuration data comprising:
first component configuration data representative of a configuration of the first software component executed by the first computing entity of the compute cluster to provide a first service, the first component configuration data being derived from a first configuration file of the first software component and including a first address used by the first software component; and second component configuration data representative of a configuration of the second software component executed by the second computing entity of the compute cluster to provide a second service, the second component configuration data being derived from a second configuration file of the second software component and including a second address used by the second software component;

prior to deployment of the first software component and the second software component, process the cluster configuration data to identify an error in the cluster configuration data, based on the first address or the second address being previously unknown in the configuration of the compute cluster, the error relating to a service-level dependency between the first software component and at least one other software component of the compute cluster, wherein processing the cluster configuration data to identify the error comprises:

processing the cluster configuration data to generate:
a representation of the first computing entity; and
a representation of the second computing entity;

obtaining a plurality of available functions, the plurality of available functions comprising a user-defined function defined at least in part by:
a clause, and
a literal;

simulating the execution of the plurality of available functions against the representation of the first computing entity and the representation of the second computing entity;

identifying the error based on the simulated execution of the plurality of available functions; and in response to identifying the error, generate verification information associated with the error.

20. A non-transitory processor-readable medium having tangibly stored thereon instructions that, when executed by a processor of a device, cause the device to verify a configuration of a compute cluster by:

obtaining cluster configuration data representative of the configuration of the compute cluster, wherein the compute cluster comprises a plurality of computing entities including a first entity and a second entity, each computing entity being a node configured to execute one or more respective software components of a plurality of software components, the plurality of software components including a first software component and a second software component, the cluster configuration data comprising:

first component configuration data representative of a configuration of the first software component executed by the first computing entity of the compute cluster to provide a first service, the first component configuration data being derived from a first configuration file of the first software component and including a first address used by the first software component; and second component configuration data representative of a configuration of the second software component executed by the second computing entity of the compute cluster to provide a second service, the second component configuration data being derived from a second configuration file of the second software component and including a second address used by the second software component;

prior to deployment of the first software component and the second software component, processing the cluster configuration data to identify an error in the cluster configuration data, based on the first address or the second address being previously unknown in the configuration of the compute cluster, the error relating to a service-level dependency between the first software component and at least one other software component of the compute cluster, wherein processing the cluster configuration data to identify the error comprises:

processing the cluster configuration data to generate:
a representation of the first computing entity; and
a representation of the second computing entity;

obtaining a plurality of available functions, the plurality of available functions comprising a user-defined function defined at least in part by:
a clause; and
a literal;

applying the plurality of available functions to the representation of the first computing entity and the representation of the second computing entity;

identifying the error based on the application of the plurality of available functions; and in response to identifying the error, generating verification information associated with the error.

* * * * *